US 11,119,303 B2

(12) United States Patent
Shimada (10) Patent No.: US 11,119,303 B2
(45) Date of Patent: Sep. 14, 2021

(54) WHOLE SLIDE IMAGE CREATION DEVICE

(71) Applicant: General Incorporated Association HAKUAKAI, Tokyo (JP)

(72) Inventor: Osamu Shimada, Tokyo (JP)

(73) Assignee: GENERAL INCORPORATED ASSOCIATION HAKUAKAI, Tokyo (JP)

( * ) Notice: Subject to any disclaimer, the term of this patent is extended or adjusted under 35 U.S.C. 154(b) by 0 days.

(21) Appl. No.: 16/964,211

(22) PCT Filed: Apr. 26, 2019

(86) PCT No.: PCT/JP2019/017828
§ 371 (c)(1),
(2) Date: Jul. 23, 2020

(87) PCT Pub. No.: WO2019/235105
PCT Pub. Date: Dec. 12, 2019

(65) Prior Publication Data
US 2021/0041684 A1 Feb. 11, 2021

(30) Foreign Application Priority Data
Jun. 5, 2018 (JP) .............................. JP2018-107551

(51) Int. Cl.
*G02B 21/36* (2006.01)
*G06K 9/32* (2006.01)
(Continued)

(52) U.S. Cl.
CPC ......... *G02B 21/365* (2013.01); *G06K 9/3233* (2013.01); *G06K 9/6201* (2013.01); *H04N 5/23296* (2013.01)

(58) Field of Classification Search
None
See application file for complete search history.

(56) References Cited

U.S. PATENT DOCUMENTS

2007/0258640 A1* 11/2007 Abe ....................... G06T 7/001
382/159
2015/0310306 A1* 10/2015 Song ....................... G06T 3/00
382/159
(Continued)

FOREIGN PATENT DOCUMENTS

CN 107148632 A 9/2017
JP 2007-293732 A 11/2007
(Continued)

OTHER PUBLICATIONS

International Search Report and Written Opinion dated Jun. 11, 2019, in connection with International Patent Application No. PCT/JP2019/017828, filed Apr. 26, 2019, 8 pgs (including translation).

(Continued)

*Primary Examiner* — James M Anderson, II
(74) *Attorney, Agent, or Firm* — Chiesa Shahinian & Giantomasi PC (57) ABSTRACT

A whole slide image creation device including a first image-capture control unit for capturing an image-capture region for a pathological specimen at a first magnification and a second magnification; a storage unit for storing a first training image corresponding to the first magnification and a second training image corresponding to the second magnification; a calculation unit for pattern matching between a first image captured at the first magnification and the first training image to calculate a first degree-of-match, and between a second image captured at the second magnification and the second training image to calculate a second degree-of-match; a magnification selection unit for selecting the first magnification or the second magnification for capturing the entire pathological specimen on the basis of the first degree-of-match and the second degree-of-match; and a (Continued)

second image-capture control unit for capturing the entire pathological specimen at the selected magnification for each segmented region.

8 Claims, 7 Drawing Sheets

(51) Int. Cl.
    *G06K 9/62*     (2006.01)
    *H04N 5/232*     (2006.01)

(56) References Cited

U.S. PATENT DOCUMENTS

2017/0091580 A1     3/2017   Song et al.
2020/0211233 A1*   7/2020   Siegel .................. G02B 21/368

FOREIGN PATENT DOCUMENTS

| | | |
|---|---|---|
| JP | 2013-054083 A | 3/2013 |
| JP | 2015-184612 A | 10/2015 |
| JP | 2017-516248 A | 6/2017 |
| WO | 2015164828 A1 | 10/2015 |
| WO | 2018042413 A1 | 3/2018 |

OTHER PUBLICATIONS

International Preliminary Report on Patentability (Chapter I) dated Dec. 8, 2020, in connection with International Patent Application No. PCT/JP2019/017828, 8 pgs. (including translation).

* cited by examiner

| (1,9) | (2,9) | (3,9) | (4,9) | (5,9) | (6,9) | (7,9) | (8,9) | (9,9) |
|---|---|---|---|---|---|---|---|---|
| (1,8) | (2,8) | (3,8) | (4,8) | (5,8) | (6,8) | (7,8) | (8,8) | (9,8) |
| (1,7) | (2,7) | (3,7) | (4,7) | (5,7) | (6,7) | (7,7) | (8,7) | (9,7) |
| (1,6) | (2,6) | (3,6) | (4,6) | (5,6) | (6,6) | (7,6) | (8,6) | (9,6) |
| (1,5) | (2,5) | (3,5) | (4,5) | (5,5) | (6,5) | (7,5) | (8,5) | (9,5) |
| (1,4) | (2,4) | (3,4) | (4,4) | (5,4) | (6,4) | (7,4) | (8,4) | (9,4) |
| (1,3) | (2,3) | (3,3) | (4,3) | (5,3) | (6,3) | (7,3) | (8,3) | (9,3) |
| (1,2) | (2,2) | (3,2) | (4,2) | (5,2) | (6,2) | (7,2) | (8,2) | (9,2) |
| (1,1) | (2,1) | (3,1) | (4,1) | (5,1) | (6,1) | (7,1) | (8,1) | (9,1) |

| 65 | 66 | 67 | 68 | 69 | 70 | 71 | 72 | 73 |
|----|----|----|----|----|----|----|----|----|
| 64 | 37 | 38 | 39 | 40 | 41 | 42 | 43 | 74 |
| 63 | 36 | 17 | 18 | 19 | 20 | 21 | 44 | 75 |
| 62 | 35 | 16 | 5  | 6  | 7  | 22 | 45 | 76 |
| 61 | 34 | 15 | 4  | 1  | 8  | 23 | 46 | 77 |
| 60 | 33 | 14 | 3  | 2  | 9  | 24 | 47 | 78 |
| 59 | 32 | 13 | 12 | 11 | 10 | 25 | 48 | 79 |
| 58 | 31 | 30 | 29 | 28 | 27 | 26 | 49 | 80 |
| 57 | 56 | 55 | 54 | 53 | 52 | 51 | 50 | 81 |

(b)

WHOLE SLIDE IMAGE CREATION DEVICE

CROSS-REFERENCE TO RELATED APPLICATIONS

This application is a national stage under 35 U.S.C. § 371 of International Patent Application No. PCT/JP2019/017828, filed Apr. 26, 2019, which claims priority to Japanese Patent Application No. 2018-107551, filed Jun. 5, 2018, the disclosure of both is incorporated herein by reference in its entirety.

TECHNICAL FIELD

The present invention relates to a whole slide image creation device, which captures a whole image of a slide glass (preparation) enclosing a pathology specimen to generate digital image data, and which enables a pathology diagnosis based on the generated digital image data.

BACKGROUND ART

A device, which performs digital data processing of images observed by optical microscope and observes the image over a display, is recently used in the field of pathology, etc. The device such as a digital microscope, a remote-controlled microscope, and a whole slide image creation device, is recognized as the remarkable state-of-the-art technology to fight against cancer at present.

The digital microscope is an optical microscope, in which a pathology specimen can be observed over a display, via a digital camera. The remote-controlled microscope is an optical microscope in which a digital camera and an electrically-driven stage are added to a conventional optical microscope, whereby the observation can be performed. The whole slide image creation device is a device to capture a whole image of pathology specimen, by means of a slide glass (preparation) enclosing the pathology specimen, so as to generate digital image data, whereby the whole images are digitized, and stored in hard discs, DVDs, etc.

A known whole slide image creation device is disclosed in Patent Literature 1. The whole slide image creation device, first, captures a whole pathology specimen at a basic magnification, and specifies a region of interest based on the image data of the whole pathology specimen captured at the basic magnification, and captures the region of interest at a magnification higher than the basic magnification.

CITATION LIST

Patent Literature

Patent Literature 1: JP 2013-54083 A.

SUMMARY OF THE INVENTION

Technical Problems

However, the whole slide image creation device takes a long time to specify the region of interest. The whole slide image device also takes a long time to capture the region of interest. This is because the device captures the image of pathology specimen at an optimal magnification for the pathology diagnosis even where the device captures the image of the specified region of interest at a magnification higher than the basic magnification, and the device observes the region of interest by varying magnifications, and the device captures the image after determination of the optimal magnification for the pathology diagnosis.

It is an object of the present invention to provide a whole slide image creation device by which a whole slide image for the pathology diagnosis is created efficiently in a short period of time.

Solution to Problem

A whole slide image creation device according to one aspect includes a first image-capture controller, a storage, a calculator, a magnification selector, and a second image-capture controller. The first image-capture controller captures a first image-capture region of a pathology specimen, at least at a first magnification and at a second magnification. The storage stores at least a first teacher image corresponding to the first magnification, and a second teacher image corresponding to the second magnification. The calculator performs pattern matching between a first image captured at the first magnification and the first teacher image to calculate a first matching degree, and performing pattern matching between a second image captured at the second magnification and the second teacher image to calculate a second matching degree. The magnification selector selects the first magnification or the second magnification as the magnification, at which a whole image of the pathology specimen is captured on the basis of the first matching degree and the second matching degree calculated by the calculator. The second image-capture controller capturing the whole image of the pathology specimen at the first magnification or the second magnification, for each segmented region corresponding to the first magnification or the second magnification selected by the magnification selector.

The whole slide image creation device according to another aspect includes the first image-capture region that is a region in the vicinity of the center of the pathology specimen.

The whole slide image creation device according to still another aspect includes the first teacher image and the second teacher image that include, respectively, a plurality of teacher images.

The whole slide image creation device according to still another aspect includes the second image-capture controller that sequentially captures images of segmented regions positioned on the outer side of the first image-capture region, along a spiral line toward the outer side, until the capturing of the whole image of the pathology specimen is terminated.

Advantageous Effects of Invention

According to the present invention, it is possible to provide the whole slide image creation device by which the whole slide image for the pathology diagnosis is created efficiently in a short period of time.

DESCRIPTION OF EMBODIMENT

Figure 1:
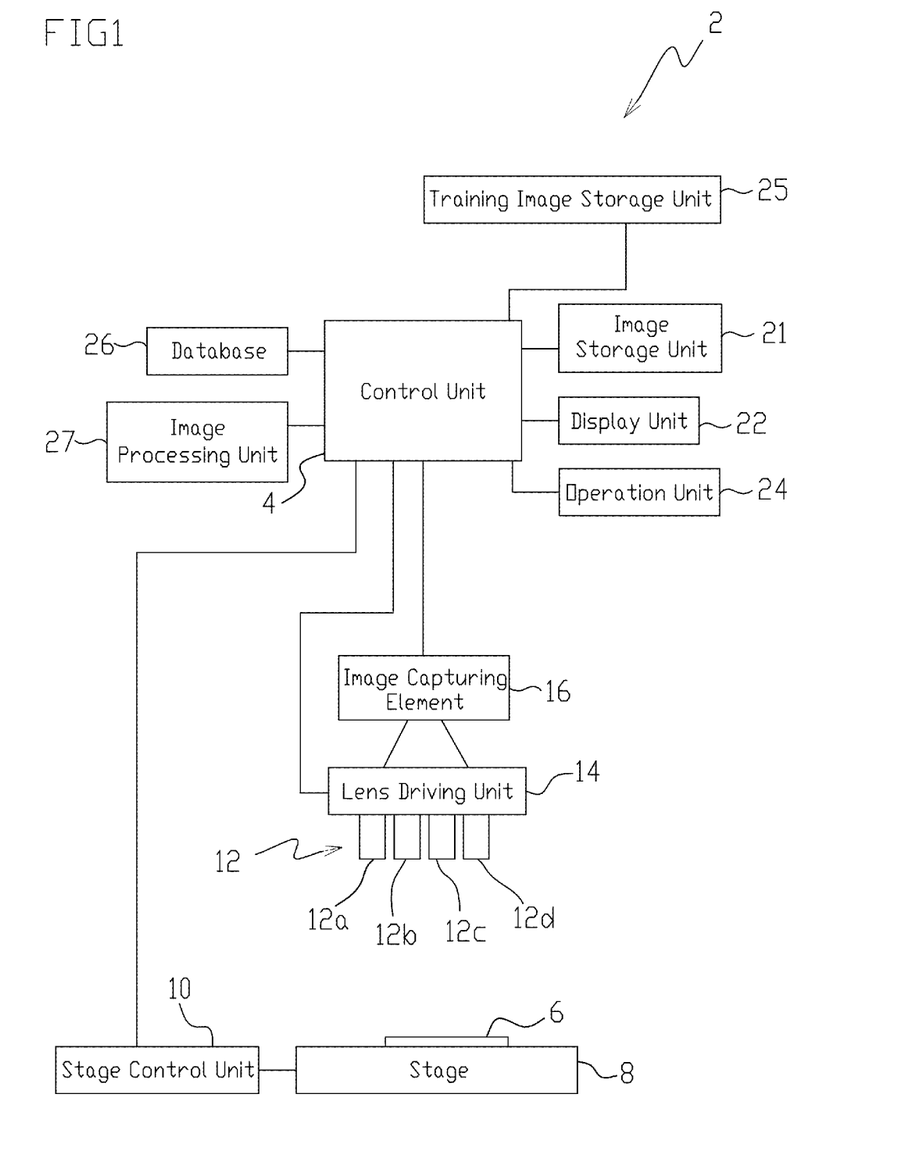
FIG. 1 is a block diagram showing an overall structure of a whole slide image creation device according to an embodiment.

A whole slide image creation device according to an embodiment of the present invention will be explained in detail, with reference to drawings attached hereto. FIG. 1 is a block diagram showing an overall structure of a whole slide image creation device 2 according to the embodiment. The whole slide image creation device 2 is installed, for example, in a pathology examination room of a clinic, and includes a control unit (controller) 4, which integrally controls each part of the whole slide image creation device 2. The control unit 4 is in connection with: a stage control unit (stage controller) 10 for moving a stage 8 on which a preparation 6 is mounted; a lens driving unit (lens driver) 14 for controlling driving of objective lenses 12 (12a, 12b, 12c, 12d) through which the preparation 6 is observed; an image capturing element 16, composed of CCD, etc., for capturing images of subjects formed on an image capturing surface by the objective lens 12; an image storage unit 21 for temporarily store image data captured by the image capturing element 16; a display unit 22 for displaying images, etc., on the basis of the image data captured by the image capturing element 16; an operation unit 24 provided with a start button (not illustrated) for starting a series of image capturing process, etc.; a teacher image storage unit 25, which stores teacher images used for the selection of image capturing magnification when a whole image of a pathology specimen is captured; a database 26 for storing image data captured by the image capturing element 16; and an image processing unit 27 for performing image processing, such as a generation processing of a single image data on the basis of a plurality of image data stored in the database 26, or a pattern matching processing for the selection of image capturing magnification, etc.

The whole slide image creation device 2 includes, as the objective lenses 12, for example, an objective lens 12a for observing a pathology specimen 40 (see FIG. 2) at 4-times objective magnification, an objective lens 12b for observing the pathology specimen 40 at 10-times objective magnification, an objective lens 12c for observing the pathology specimen 40 at 20-times objective magnification, and an objective lens 12d for observing the pathology specimen 40 at 40-times objective magnification.

Figure 5:
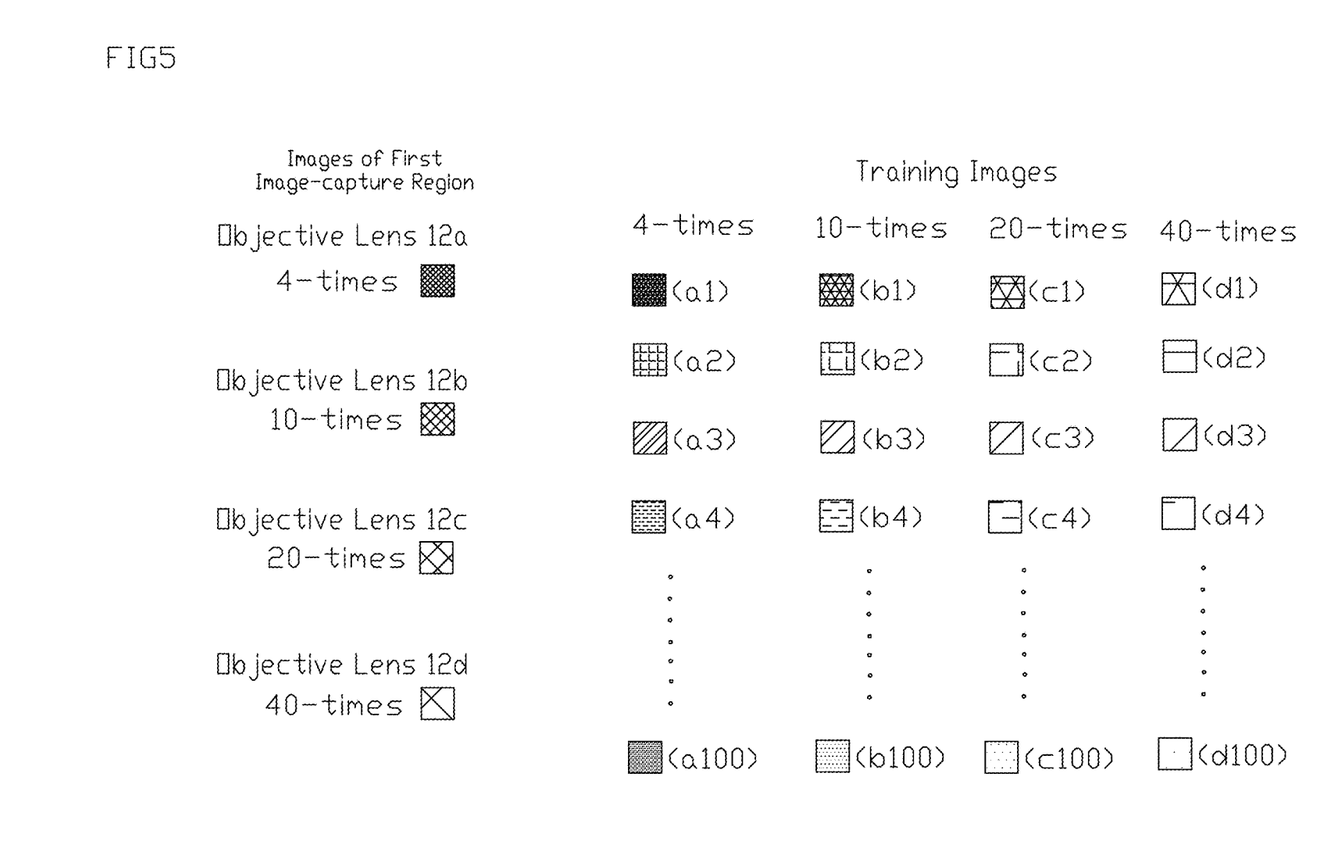
FIG. 5 is a view showing teacher images used in the image-capture magnification selection process of the whole slide image creation device according to the embodiment.

The teacher image storage unit 25 stores, as illustrated in FIG. 5, one hundred teacher images (a1) to (a100) captured at 4-times objective magnification, one hundred teacher images (b1) to (b100) captured at 10-times objective magnification, one hundred teacher images (c1) to (c100) captured at 20-times objective magnification, and one hundred teacher images (d1) to (d100) captured at 40-times objective magnification.

Figure 2:
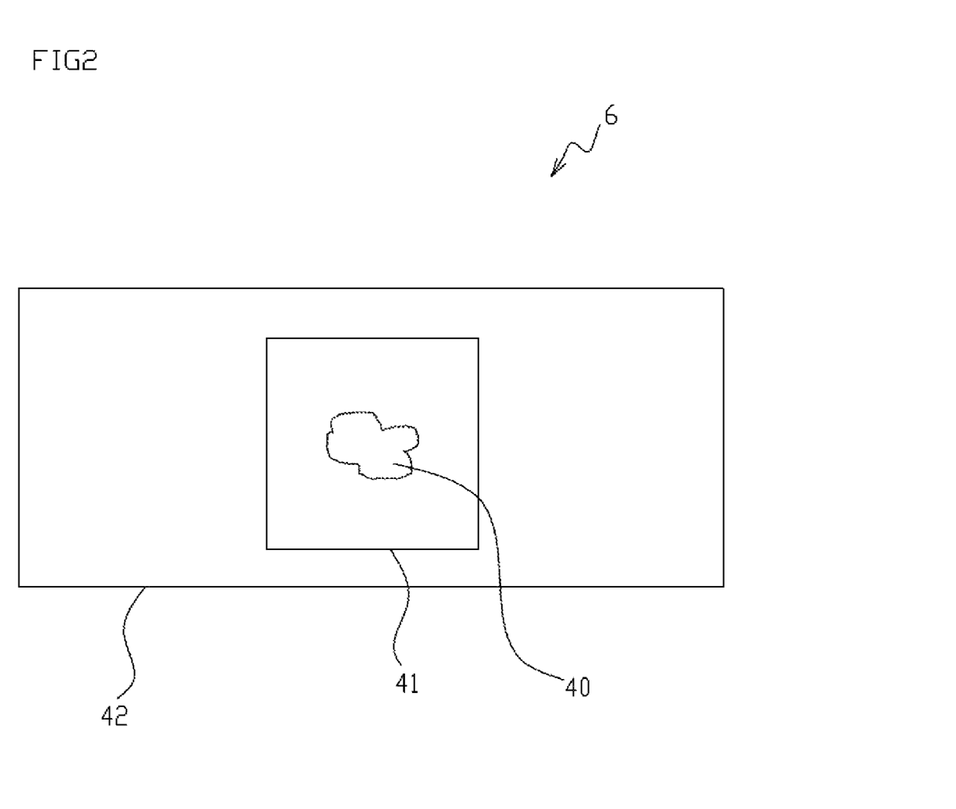
FIG. 2 is a view showing a preparation used for the whole slide image creation device according to the embodiment.

FIG. 2 shows the preparation 6 used for the whole slide image creation device 2 according to the present embodiment. The preparation 6 is composed of a slide glass 42, in which a pathology specimen 40, such as a tissue fragment collected from a patient at a clinic, has been enclosed by a cover glass 41.

Figure 3:
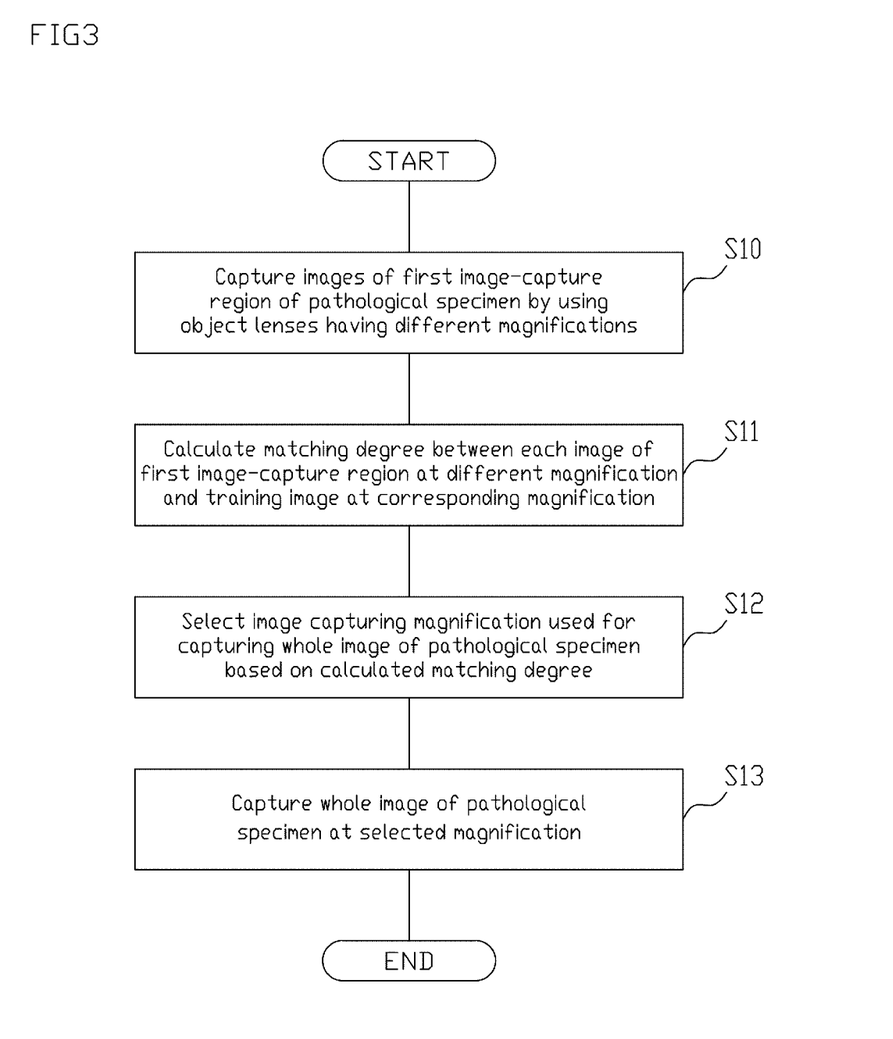
FIG. 3 is a flowchart showing an image-capture magnification selection process of the whole slide image creation device according to the embodiment.

FIG. 3 is a flowchart showing an image capturing process of the whole slide image creation device 2 according to the present embodiment. First, the preparation 6 is placed at a predetermined position on the stage 8, and the objective lenses 12 are positioned above a position in the vicinity of the center of the pathology specimen 40 (a first image-capture region 45) (see FIG. 4). Thus, when the start button of the operation unit 24 is operated, the control unit 4 initiates the image capturing of the first image-capture region (step S10).

Figure 4:
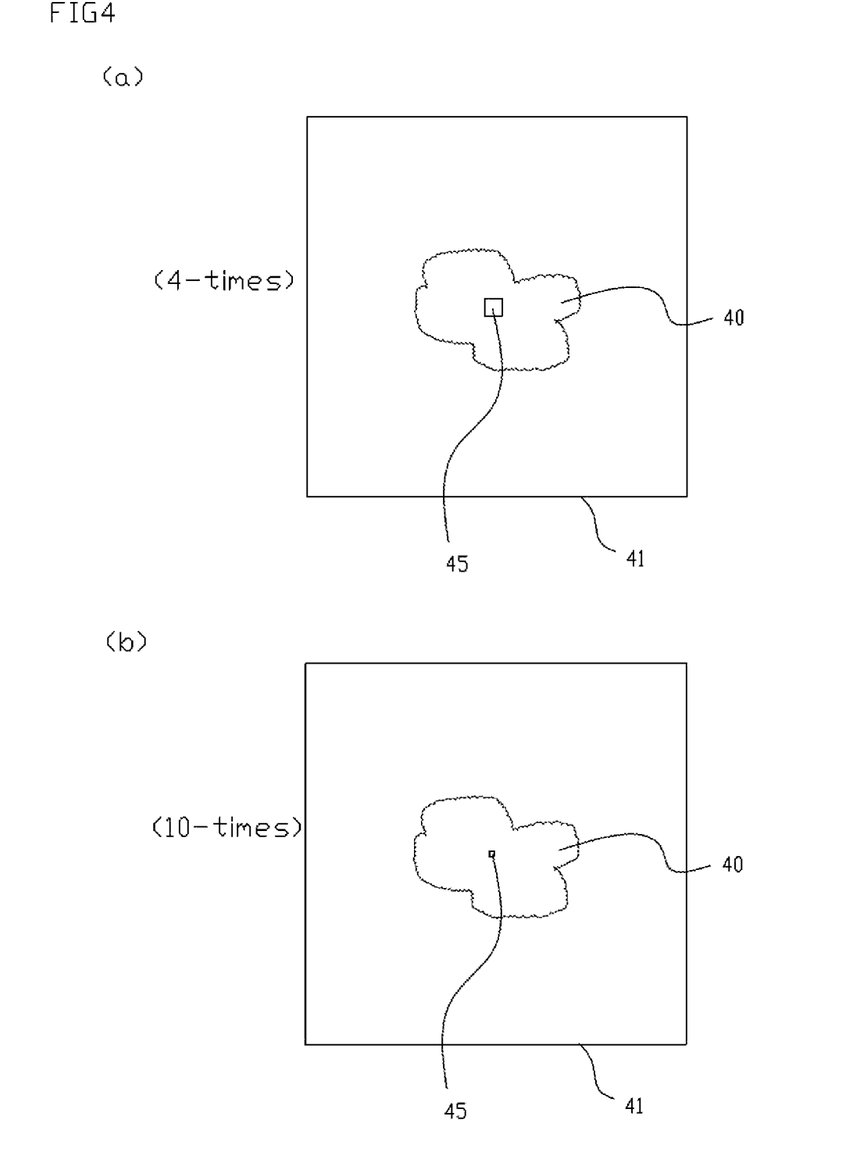
FIG. 4 is a view explaining the image-capture magnification selection process of the whole slide image creation device according to the embodiment.

Accordingly, the control unit 4 sequentially captures images of the first image-capture region 45 of the pathology specimen 40, by using the objective lens 12a, the objective lens 12b, the objective lens 12c and the objective lens 12d. The images of the first image-capture region 45 (see FIG. 5) are stored, respectively, in the image storage unit 21. The objective lens 12a, the objective lens 12b, the objective lens 12c and the objective lens 12d have the different magnifications, respectively, and therefore, for example, where the objective lens 12a is used for the image capturing, the first image-capture region 45 will be a region as shown in FIG. 4 (a), and where the objective lens 12b is used for the image capturing, the first image-capture region 45 will be a region as shown in FIG. 4 (b). Moreover, where the images of the first image-capture region 45 are captured by using the objective lens 12c or the objective lens 12d, the region shall be in a size, respectively, which has been designated corresponding to the objective lens 12c or the objective lens 12d, respectively.

Next, the control unit 4 controls the image processing unit 27, and calculates a matching degree of each image of the first image-capture region 45, with a teacher image at a corresponding magnification (step S11). Namely, as illustrated in FIG. 5, the control unit 4 performs a pattern matching, between the image of the first image-capture region 45 captured by using the objective lens 12a, and each of the teacher images captured at the 4-times objective magnification (a1 to a100), so as to obtain a highest matching degree (matching degree A) among the matching degrees of the respective images. Moreover, the control unit 4 performs a pattern matching, between the image of the first image-capture region 45 captured by using the objective lens 12b, and each of the teacher images captured at the 10-times objective magnification (b1 to b100), so as to obtain a highest matching degree (matching degree B) among the matching degrees of the respective images. Moreover, the control unit 4 performs a pattern matching, between the image of the first image-capture region 45 captured by using the objective lens 12c, and each of the teacher images captured at the 20-times objective magnification (c1 to c100), so as to obtain a highest matching degree (matching degree C.) among the matching degrees of the respective images. And moreover, the control unit 4 performs a pattern matching, between the image of the first image-capture region 45 captured by using the objective lens 12d, and each of the teacher images captured at the 40-times objective magnification (d1 to d100), so as to obtain a highest matching degree (matching degree D among the matching degrees of the respective images.

Next, the control unit 4 selects an image capturing magnification used for capturing of the whole image of the pathology specimen, on the basis of the calculated matching degree (step S12). Namely, the control unit 4 designates the magnification of the highest matching degree, among the matching degree A to the matching degree D, as the image capturing magnification of the pathology specimen. For example, where the matching degree A is 98%, the matching degree B is 60%, the matching degree C. is 80%, and matching degree D is 55%, 4-times objective magnification shall be selected as the image capturing magnification of the pathology specimen.

Figure 6:
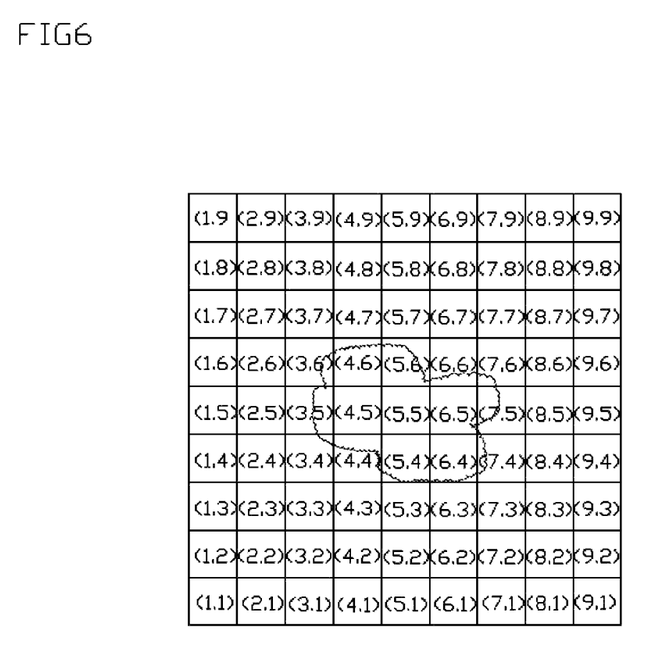
FIG. 6 is a view showing an order of image capturing of segmented regions by the whole slide image creation device according to the embodiment.
Figure 7:
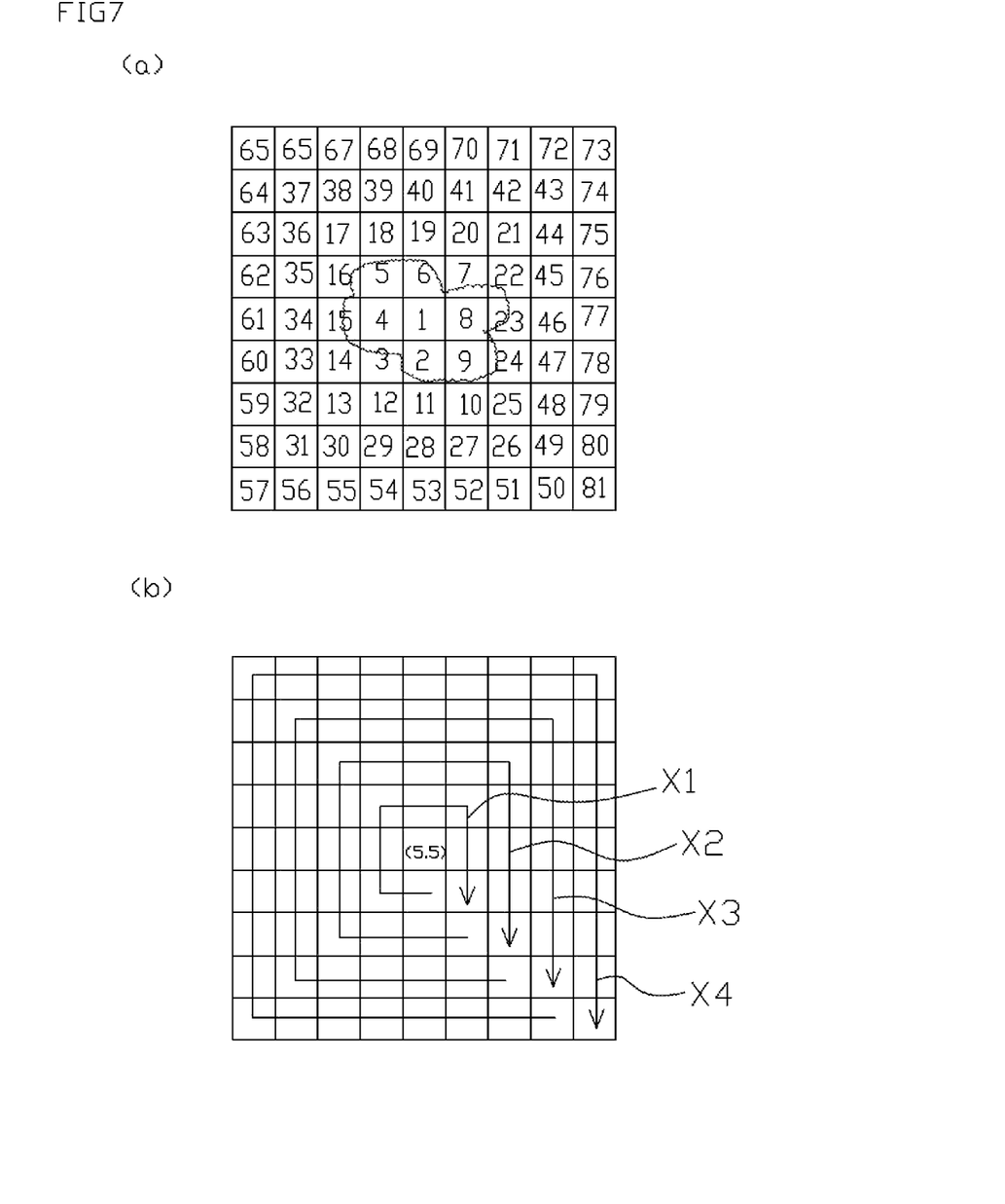
FIG. 7 is a view showing an order of image capturing of segmented regions by the whole slide image creation device according to the embodiment.

Next, the control unit 4 captures the whole image of the pathology specimen by using the objective lens 12a, having the 4-times objective magnification, which has been selected as the image capturing magnification (step S13). First, the control unit 4 divides a region including the pathology specimen 40 of the preparation 6, into grid-shaped segmented regions, each of which being the same size as that of the first image-capture region 45 shown in FIG. 4 (a). FIG. 6 illustrates a state, in which the region including the pathology specimen 40 of the preparation 6 is divided into eighty-one segmented regions (1,1) to (9,9). The image capturing of the pathology specimen 40 is sequentially performed, along a spiral line outwardly, by capturing images of the segmented regions positioned on the outer side of the first image-capture region 45 (5,5). Namely, the images are captured, as illustrated in FIG. 7 (a), in the order of the segmented region "2," the segmented region "3," the segmented region "4," the segmented region "5," . . . and so forth. For reference, the captured images are stored sequentially in the image storage unit 21. Moreover, the image processing unit 27 determines whether the images of the pathology specimen are included or not, among the images stored in the image storage unit 21. Where the images of the pathology specimen are included, the images of the corresponding segmented regions are stored in the database 26 with adding thereto the position information of these segmented regions.

Among eight images of the segmented regions positioned along a line X1 shown to FIG. 7(b), if there is at least one image including an image of the pathology specimen, then, the images of the segmented regions positioned along a line X2 are sequentially captured. Among sixteen images of the segmented regions positioned along the line X2, if there is at least one image including an image of the pathology specimen, then, the images of the segmented regions positioned along a line X3 are sequentially captured. Among twenty-four images of the segmented regions positioned along the line X3, if there is at least one image including an image of the pathology specimen, then, the images of the segmented regions positioned along a line X4 are sequentially captured. On the other hand, among the twenty-four images of the segmented regions positioned along the line X3, if there is no image including any image of the pathology specimen, then, the image capturing of the pathology specimen is terminated.

The control unit 4 controls the image processing unit 27, and joins a plurality of image data of the segmented sections, which have been stored in the database 26, on the basis of the position information added to the image data, and generates the whole image data of the pathology specimen 40.

According to the whole slide image creation device of the embodiment, the image capturing magnification for capturing the whole image of the pathology specimen is determined by only using the image of the first image-capture region 45, and therefore, it is possible to select the image capturing magnification in a short period of time. Moreover, when the images of the pathology specimen are captured, the images of the segmented regions positioned on the outer side of the first image-capture region are captured sequentially along the spiral line toward the outer side. The image capturing is terminated when the capturing of the whole image of the pathology specimen is completed. Therefore, a whole slide image for the pathology diagnosis can be created efficiently in a short period of time.

The invention claimed is:

1. A whole slide image creation device comprising:
   an image-capture controller capturing a first image-capture region of a pathology specimen at a first magnification and at a second magnification;
   a storage storing a first training image corresponding to the first magnification, and a second training image corresponding to the second magnification;
   a calculator performing pattern matching between a first image captured at the first magnification and the first training image to calculate a first matching degree, and performing pattern matching between a second image captured at the second magnification and the second training image to calculate a second matching degree; and
   a magnification selector selecting the first magnification or the second magnification as a magnification at which a whole image of the pathology specimen is captured based on the first matching degree and the second matching degree calculated by the calculator, wherein
   the image-capture controller captures the whole image of the pathology specimen at the first magnification or the second magnification, for each segmented region corresponding to the first magnification or the second magnification selected by the magnification selector.

2. The whole slide image creation device according to claim 1, wherein the first image-capture region is a region in a vicinity of a center of the pathology specimen.

3. The whole slide image creation device according to claim 1, wherein the first training image and the second training image include, respectively, a plurality of training images.

4. The whole slide image creation device according to claim 1, wherein, the image-capture controller sequentially captures images of segmented regions positioned on an outer side of the first image-capture region, along a spiral line toward the outer side, until the capturing of the whole image of the pathology specimen is terminated.

5. The whole slide image creation device according to claim 2, wherein the first training image and the second training image include, respectively, a plurality of training images.

6. The whole slide image creation device according to claim 2, wherein, the image-capture controller sequentially captures images of segmented regions positioned on an outer side of the first image-capture region, along a spiral line toward the outer side, until the capturing of the whole image of the pathology specimen is terminated.

7. The whole slide image creation device according to claim 3, wherein, the image-capture controller sequentially captures images of segmented regions positioned on an outer side of the first image-capture region, along a spiral line toward the outer side, until the capturing of the whole image of the pathology specimen is terminated.

8. The whole slide image creation device according to claim 5, wherein, the image-capture controller sequentially captures images of segmented regions positioned on an outer side of the first image-capture region, along a spiral line toward the outer side, until the capturing of the whole image of the pathology specimen is terminated.

* * * * *